UNITED STATES PATENT OFFICE.

KENNETH F. COOPER, OF BUFFALO, NEW YORK, ASSIGNOR TO AMERICAN CYANAMID COMPANY, OF NASHVILLE, TENNESSEE, ORGANIZED UNDER THE LAWS OF MAINE.

CYCLICAL PROCESS OF FIXING ATMOSPHERIC NITROGEN.

1,100,539.     Specification of Letters Patent.     Patented June 16, 1914.

No Drawing.     Application filed February 10, 1914. Serial No. 817,944.

*To all whom it may concern:*

Be it known that I, KENNETH F. COOPER, a citizen of the United States, residing at Buffalo, in the county of Erie and State of New York, have invented certain new and useful Improvements in Cyclical Processes of Fixing Atmospheric Nitrogen; and I do hereby declare the following to be a full, clear, and exact description of the invention, such as will enable others skilled in the art to which it appertains to make and use the same.

This invention relates to an improvement in a step of the cyclical process of the fixation of atmospheric nitrogen in the form of cyanamid and has for its object to reduce the cost of the manufacture of calcium cyanamid and render the general process more expeditious all as will appear below.

With these and other objects in view the invention consists in the novel steps constituting my process more fully hereinafter disclosed and particularly pointed out in the claims.

In order that my invention may be clear it is said: In the production of cyanamid it is customary to first make calcium carbid by the usual process of treating a mixture of caustic lime and coke, or other carbonaceous material, in an electric furnace; this carbid is then removed from the furnace, ground fine, and charged into a cyanamid oven, where at suitable temperatures in the presence of nitrogen it is nitrified, with the production of calcium cyanamid, $CaCN_2$. This cyanamid, as usually made, carries about 60% calcium cyanamid, about 25% lime, 12% graphite, and other impurities in minor quantities, derived principally from the presence of foreign materials in the lime, and the reducing agent used in the carbid furnace. As is well known, if such cyanamid is treated with steam, at a high temperature, the calcium cyanamid is broken up with the evolution of ammonia, as indicated by the following reaction:

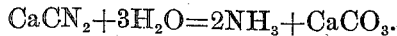

$$CaCN_2 + 3H_2O = 2NH_3 + CaCO_3.$$

The ammonia is evolved as a gas and there is left behind in the treating apparatus a sludge consisting of calcium carbonate derived from the above reaction, calcium hydrate from the hydration of the lime in the cyanamid, graphite unchanged, as present in the cyanamid, and the other materials, or impurities, most of them unchanged, as they occurred in the cyanamid.

An essential feature of my invention is the carrying out of these reactions in such a form that the resulting sludge, or at least a large part of it, can again be made suitable for use in the carbid furnace. It is well known that the carbid furnace does not work efficiently upon charges which contain water, hydrated lime, or very much carbonate of lime, and those experienced in the art have taken unusual precautions to eliminate these materials from the carbid furnace charge. It is, therefore, not always economically possible to charge this sludge, prepared in the manufacture of ammonia, directly into the carbid furnace, except where power is extremely cheap. Although the drying of this sludge offers no great difficulties, yet the dried product obtained is very dusty, and in itself not particularly well suited to charging into the carbid furnace. And although it is quite possible to burn this sludge in a rotary kiln, or similar device, designed to heat fine, dusty material to high temperatures, thus furnishing a resulting product containing caustic lime, and more or less graphite, which did not burn out in the calcining process; yet even this material, prepared in this way, may be used only to a limited extent in the carbid furnace, as it is blown out very easily, and chokes up the charge of the furnace, rendering the operation more or less unsatisfactory. On the other hand, I have discovered that if in preparing the cyanamid for treatment with steam a small quantity of an alkaline or alkali salt, such as sodium hydrate, sodium chlorid, sodium sulfate, sodium carbonate, or similar potassium salt, is added to the cyanamid it in no way materially effects the evolution of the ammonia, and remains behind in the sludge, either as the salt added, or changed in form somewhat as a result of a double decomposition through a reaction with the calcium salts in the cyanamid; and that the resulting sludge will be free from the above objections, as will now appear. The quantity of these salts to be added in order to produce the desired results is quite small, being rarely over 5%, equivalent of $Na_2O$, and I prefer to use one to two per cent. of the weight of cyanamid decomposed. The burning of the sludge containing these compounds in the presence of the small amount of soda, or similar salt, is next accomplished which leads to a clinkering action in the rotary kiln, or other calcination furnace, and produces a product which is porous, hard, and of a suitable size for carbid furnace charges. In actual tests I have found that the addition of an equivalent of 1% $Na_2O$ enabled me to burn a sludge containing these compounds to a loose, porous clinker averaging about ¾″ in diameter.

What I claim is:

1. The cyclical process of the fixation of atmospheric nitrogen which consists in the manufacture of calcium carbid; crushing the same; the nitrification of the crushed carbid for the purpose of forming a cyanamid; the addition of an alkali salt to the said cyanamid, the decomposition of the said cyanamid by the use of steam for the purpose of producing ammonia; and the burning and reuse of the sludge thus produced containing said alkali salt in a carbid furnace to form calcium carbid, substantially as described.

2. The process of producing a sludge for use in making calcium carbid, which consists in adding an alkali salt to commercial calcium cyanamid; subjecting said cyanamid to decomposition in the presence of steam; and drying the sludge containing said alkali salt thus produced, substantially as described.

3. The process of producing a sludge for use in making calcium carbid which consists in adding an alkali salt to commercial calcium cyanamid; subjecting said mixed cyanamid and salt to the decomposing action of steam thus forming a sludge containing said salt; and drying and calcining said sludge and salt, substantially as described.

4. The cyclical process of the fixation of nitrogen consisting in the manufacture of calcium carbid; crushing the same; the nitrification of the crushed carbid for the purpose of forming a cyanamid; the addition to the cyanamid of a salt to facilitate the subsequent clinkering of the sludge to be formed; the decomposition of the mixture of cyanamid and the above salts by the use of steam for the purpose of producing ammonia thereby producing a sludge containing said salt; the calcination of the sludge produced by said decomposition at temperatures sufficient to drive off all moisture and carbon dioxid from the calcium salts, and to clinker the mass; and the reuse of the clinkered product in a carbid furnace, substantially as described.

In testimony whereof I affix my signature, in presence of two witnesses.

KENNETH F. COOPER.

Witnesses:
A. D. WHITTEMORE,
W. L. BONN.